(12) United States Patent
Giaimo, III et al.

(10) Patent No.: US 7,389,153 B2
(45) Date of Patent: Jun. 17, 2008

(54) ENABLING SEPARATE CHAT AND SELECTIVE ENABLEMENT OF MICROPHONE

(75) Inventors: Edward C. Giaimo, III, Bellevue, WA (US); Matthew J. Stipes, Woodinville, WA (US); Damon V. Danieli, Clyde Hill, WA (US); Wolfgang A. Mack, Seattle, WA (US); Thomas W. Brooks, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 19 days.

(21) Appl. No.: 11/078,002

(22) Filed: Mar. 11, 2005

(65) Prior Publication Data
US 2005/0159833 A1 Jul. 21, 2005

Related U.S. Application Data

(63) Continuation of application No. 09/515,559, filed on Feb. 29, 2000, now Pat. No. 6,928,329.

(51) Int. Cl.
*G06F 17/00* (2006.01)
(52) U.S. Cl. .............................. 700/94; 381/123; 463/1
(58) Field of Classification Search .................. 700/94; 381/370, 376, 123; 463/1, 40, 42–43; 348/14, 348/14.1; 379/220.01, 221.01–221.09, 88.13; 709/204
See application file for complete search history.

(56) References Cited

U.S. PATENT DOCUMENTS

| | | | |
|---|---|---|---|
| 5,305,244 A | 4/1994 | Newman et al. | 364/708.1 |
| 5,556,107 A * | 9/1996 | Carter | 463/35 |
| 5,668,859 A * | 9/1997 | Salimando | 379/101.01 |
| 5,679,001 A | 10/1997 | Russell et al. | 434/185 |
| 5,687,221 A | 11/1997 | Oheda et al. | 379/96 |
| 5,758,079 A * | 5/1998 | Ludwig et al. | 709/204 |
| 5,818,948 A | 10/1998 | Gulick | 381/77 |
| 5,867,223 A | 2/1999 | Schindler et al. | 348/552 |
| 6,104,913 A | 8/2000 | McAllister | 455/41.1 |
| 6,106,399 A | 8/2000 | Baker et al. | 463/42 |
| 6,179,713 B1 | 1/2001 | James et al. | 463/42 |
| 6,241,612 B1 * | 6/2001 | Heredia | 463/42 |
| 6,283,760 B1 | 9/2001 | Wakamoto | 434/156 |

(Continued)

*Primary Examiner*—Vivian Chin
*Assistant Examiner*—Lao Lun-See
(74) *Attorney, Agent, or Firm*—Workman Nydegger

(57) ABSTRACT

Two different and separate audio data streams are processed through a personal computer (PC) system or other computing device so that the separate and distinct audio data streams are heard through separate sound transducers. In a preferred embodiment, chat messages received over a network during execution of a multiplayer game are processed separately from sounds produced by the multiplayer game, enabling a user to hear the game sounds from speakers, separate and distinct from verbal chat messages, which are heard through earphone(s). The earphone(s) are included in a headset, as well as a microphone that enables the user to produce verbal data that are conveyed to a hardware control unit that is connected to the PC system through a universal serial bus (USB) port. The chat audio data are converted into an analog audio signal that is heard by the user in the headphone(s) and is spatially separate and distinct from the game audio data heard through the speakers. Included on the control unit are switches that enable the user to selectively direct verbal data either to the chat session or to a voice recognition engine that converts the verbal data into commands used for controlling the game.

19 Claims, 4 Drawing Sheets

U.S. PATENT DOCUMENTS

| | | | |
|---|---|---|---|
| 6,453,022 B1 * | 9/2002 | Weinman, Jr. | 379/88.13 |
| 6,470,197 B1 | 10/2002 | Tuoriniemi et al. | 455/575 |
| 6,475,089 B1 | 11/2002 | Lee | 463/40 |
| 6,599,194 B1 | 7/2003 | Smith et al. | 463/30 |
| 6,707,827 B1 * | 3/2004 | Shaffer et al. | 370/493 |
| 6,807,562 B1 * | 10/2004 | Pennock et al. | 709/204 |
| 6,928,329 B1 * | 8/2005 | Giaimo et al. | 700/94 |
| 2002/0002586 A1 | 1/2002 | Rafal et al. | 709/205 |

* cited by examiner

ENABLING SEPARATE CHAT AND SELECTIVE ENABLEMENT OF MICROPHONE

Related Applications

This application is a continuation of prior patent application Ser. No. 09/515,559, filed on Feb. 29, 2000 now U.S. Pat. No. 6,928,329, the benefit of the filing date of which is hereby claimed under 35 U.S.C. §120.

FIELD OF THE INVENTION

This invention generally relates to a method and system for handling audio data on a computing device, and more specifically, pertains to simultaneously processing different streams of audio data and selectively directing a stream of audio data either to a chat session or to a voice recognition system for control of software.

BACKGROUND OF THE INVENTION

A conventional personal computer (PC) system typically includes a sound card that is connected to the data bus on a motherboard of the PC. Most sound cards include microphone and line level ports for input of analog audio signals and process audio data for output to external speakers. Although the analog audio signal that is output from a sound card may be stereo, and in newer sound cards, may be Dolby Prologic™ or 5.1 channel Dolby Digital™, only a single stream of audio data is processed by a sound card to produce these output channels. However, the sound processing system on a typical PC enables audio signals from various different sources to be combined to produce the single stream of audio data that is processed for output by the sound card.

Customarily, the relative volume for signals from several different sound sources such as a compact disk (CD), wave files, musical instrument digital interface (MIDI), and the line level input is controlled by a software mixer, but the resulting analog signal produced by the sound card represents only a single data stream for the mixed signals input to the sound card. The limited ability of a PC and sound card to process only a single stream of audio data is particularly troublesome during multiplayer games, as will be evident from the following. Multiplayer games have recently become very popular on the Internet because they enable a user to participate in games with other players, either as separate individuals or as team members. Microsoft Corporation's Internet Game Zone is just one web site that facilitates multiplayer games. Communication among players is often a key aspect of multiplayer game play. For example, members of a team must communicate to devise strategy during on-line chat sessions as a game progresses. Currently, players typically communicate by entering text in a chat dialog for transmission over the network to one or more selected other players in the game.

There are several disadvantages to the text-based chat sessions during multiplayer games. A text-based form of chat communication favors those players with the best typing skills; and it requires players to set aside their game control devices (e.g., a joystick or gamepad) in order to use a keyboard to chat with other players. To minimize the amount of typing required while chatting in this manner, more experienced players have developed abbreviated code to communicate longer messages with fewer characters. Newer players, who do not understand this code, are confused and alienated until they learn the shorthand abbreviations. Most of these problems could be avoided by enabling players to communicate verbally, by simply speaking into a microphone. Although a sound card is able process verbal chat messages of this type, verbal chat messaging during multiplayer game play has not been widely used, because of the limitation of PCs and sound cards noted above. If a sound card is used for processing the chat session audio data stream, sounds associated with or produced by execution of the game software on the player's PC will either be unavailable, or must be mixed with the chat audio data, thereby tending to obscure the verbal content of the chat messages. Ideally, a player should be able to hear the chat verbal communication separately from the game sounds. The game sounds will typically obscure the verbal communications at least some of the time, if the two audio data streams are mixed and processed as a single audio data stream by a sound card and PC.

One of the advantages of modern computer games played on a PC is that the PC and sound card can deliver relatively high-quality music and sound effects in sync with the action in a game. Clearly, given a choice between using a sound card to experience the game sounds, or for chatting with other players, most people have preferred to experience the game-related sounds and rely upon text-based chat sessions for communication with other players. It would therefore be advantageous to enable game players to experience both the audio data provided by the game and the audio data delivered in a chat session among players. By providing each player in a multiplayer game with a microphone and enabling them to selectively chat with other players in the game so that the sound from the chat session is delivered to headphone(s) worn by the players while the game sounds are separately reproduced by speakers attached to a sound card (or to a universal serial bus (USB) port on PCs that do not include a sound card), a much broader range of game player interaction can be achieved without sacrificing the enjoyment of the game audio data. Use of headphone(s) for reproducing the verbal messages of a chat session during game play enables the localization of the chat messages by the player and avoids problems in understanding the messages, since chat messages heard over headphone(s) are not likely to be obscured by separate game sounds heard from speakers. The problem that must be solved is how to simultaneously deliver game sounds without mixing them with the verbal messages in a stream of audio data from a chat session while the multiplayer game is being executed. By enabling players to communicate during game play in a verbal chat session, the need for a player to set aside a joystick or other game controller to enter text-based chat messages would be avoided.

It would further be desirable to enable a game player to verbally control a game rather than actuating keys on a keyboard to enter secondary game commands that are not controlled by a game input device. Finding a particular key on a keyboard can be distracting and can interfere with a player's control of a game input device, such as a joystick. Ideally, verbal control of a game should be speaker independent; it should also be possible for a player to specify words that will used to control a game, on a game-by-game basis. By providing a verbal command and control function, a player should be able to keep both hands on a game input control and map alternate or secondary game commands to the voice input. Further, the same microphone used for input of verbal chat messages should also be usable for verbal command and control of a game if an appropriate switch is provided to control the software so as to enable the user to make this selection. Thus, a player should be able to toggle the switch to selectively determine whether the analog audio signal from the microphone is directed by software to the verbal command and control of the game or instead transmitted as a chat message over the network to one or more other players. Currently, the prior art does not include hardware or software for carrying out these functions.

SUMMARY OF THE INVENTION

In accord with the present invention, a method is defined for enabling a plurality of separate and distinct audio data streams to be processed by a computing device to produce a plurality of separate and distinct audible outputs. The method includes the steps of receiving and maintaining one audio data stream separate from all other audio data streams that are input to and processed by the computing device. Each of the plurality of audio data streams are converted into a corresponding analog audio signal. A first sound transducer is then energized with the analog audio signals corresponding to the plurality of audio data streams (other than the one audio data stream), to produce a first audible output. Similarly, a second sound transducer is energized with the analog audio signal corresponding to the one audio data stream to produce a second audible output, so that separate and distinct first and second audible outputs are produced in response to the plurality of audio data streams.

The step of receiving and maintaining preferably comprises the step of receiving a chat audio data stream (i.e., the one audio data stream) over a network to which the computing device is coupled. The chat audio data stream comprises a verbal communication transmitted from a remote site over the network. In addition, the step of receiving and maintaining preferably comprises the step of executing an application program with the computing device. The application program produces an application audio data stream that is separate from the chat audio data stream.

A headset that is coupled to the computing device is provided and the digital chat audio data is converted into a chat analog audio signal for input to the headset. The headset includes the second sound transducer. Also, the headset preferably includes a microphone for input of verbal audio data that are processed by the computing device. A control unit that couples the headset to a port of the computing device is provided and includes a push-button switch that is actuatable by a user to control whether the verbal audio data are transmitted over the network to a remote site as a chat audio data stream, or are employed for verbal input of commands to control the application program being executed by the computing device. The method further includes the step of recognizing the verbal commands to produce corresponding input data that controls the application program. A user is enabled to specify a verbal command corresponding to a command entered with an input device, to enable the verbal command to be employed for entering the command in place of the input device.

The step of converting preferably includes the step of converting digital application audio data into an application analog audio signal for input to a speaker that is coupled to the computing device. The speaker comprises the first sound transducer.

Alternatively, the step of converting includes the step of encoding a specific audio data stream that comprises the one audio data stream into one channel of a multi-channel signal within the computing device and all other audio data streams into the other channels of the multi-channel signal. In addition, this method includes the step of decoding the multi-channel signal to recover the one audio data stream to produce the second analog audio output and all other channels of the multi-channel signal produce at least the first analog output. In this approach, the one audio data stream is preferably encoded as a rear channel of a surround multi-channel signal and comprises chat audio data.

Another aspect of the present invention is directed to a machine readable medium having processor executable instructions for performing the step of receiving and maintaining at least one audio data stream separate from all other audio data streams generally as discussed in regard to the preceding method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is viewed as a key component of a voice input/communications device that can be attached to a wide variety of PC and non-PC electronic devices. It will be an important component in Microsoft Corporation's Next-Generation Windows Services that explicitly target both PC and non-PC devices. It is expected that consumers will have multiple devices that use common services, and the consumer will choose the appropriate device for each situation (e.g., a PC when sitting at a desk or a cell phone when on the move). Furthermore, the devices targeted for use of the present invention will be thin consumer terminals, mobile phones, Pocket PCs, TV attached boxes (set top, gaming, video management), home servers, small business server appliances, and various focused enterprise devices. However, a first implementation of the present invention is used with a conventional PC system, as discussed below.

Figure 1:
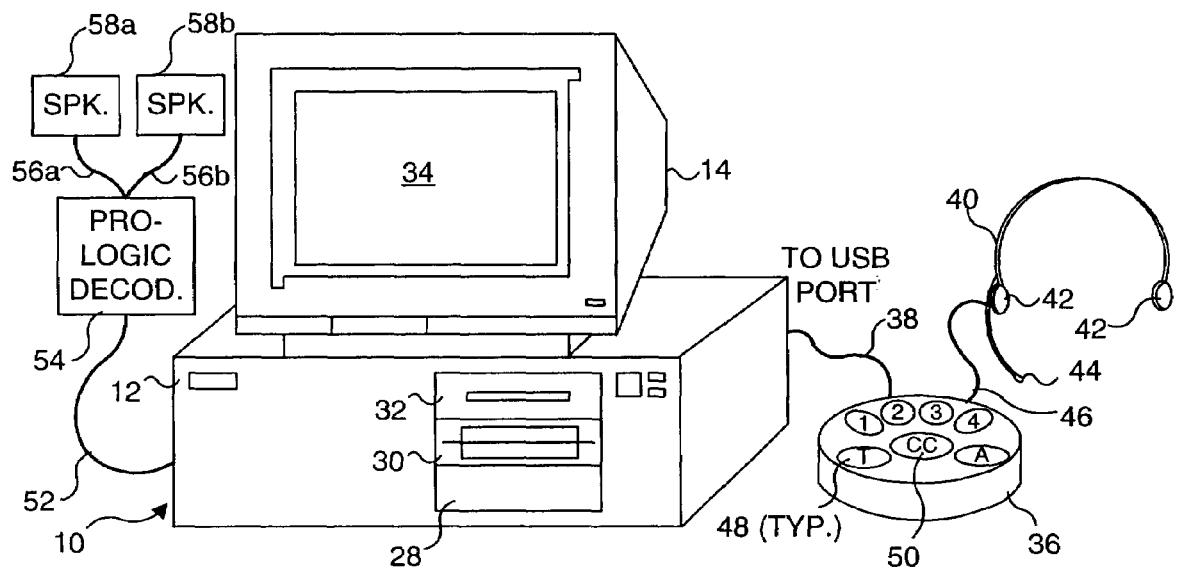
FIG. 1 is a schematic diagram illustrating a personal computer (PC) system, hardware control unit, and headset used in implementing a first preferred embodiment of the present invention.

FIG. 1 illustrates a generally conventional PC system 10, which includes a monitor 14 having a display 34. Display 34 is used to present graphics and text to a user. PC system 10 includes a processor chassis 12 in which are mounted a number of different components, which are discussed below in connection with FIG. 7. Although not required, processor chassis 12 includes a hard disk drive 28, an optical disk drive 30, which is suitable for reading optical storage media, and a magnetic disk drive 32 usable for reading magnetic media on a disk (not shown).

On the rear of processor chassis 12 are a plurality of connections (not shown) including a universal serial bus (USB) port to which a cable 38 is connected. Cable 38 thus provides communication of data between a control unit 36. Connected to control unit 36 is a headset 40 that includes one or more headphone(s) 42 and a microphone 44. A lead 46 connects headset 40 to a suitable jack (not shown) on control unit 36.

Also included on control unit 36 are a plurality of user selectable switches 48 that are shown as pushbuttons. By depressing a specific push-button switch 48, the user can select a particular individual or group of individuals in a chat session to receive a verbal communication from the user as spoken into microphone 44. Each of switches 48, when engaged by the user causes an indicator light (not shown) to be illuminated behind the switch, providing the user a visual indication of the switch buttons that have been depressed. One of the switch buttons is marked with a letter "T" in FIG. 1 to indicate that by depressing it, the user is able to talk to all of the members designated as being on the user's team in a multiplayer game. Another switch button 48 is marked with the letter "A" to indicate that by selecting it, the user can direct a verbal communication to all of the players in a multiplayer game. The communication is bi-directional during a chat session. Thus, the user hears verbal communications from other individuals, such as other players in a multiplayer game, through headphone(s) 42 when the user is a selected recipient of the verbal communication during the chat session, while playing a game.

Also included on control unit 36 is a command and control (C & C) switch 50, which is also shown as a button. By depressing C & C switch 50, the user can selectively direct a verbal command spoken into microphone 44 into a voice recognition software module executed by PC system 10 for use in controlling a software application that is running on the PC system. Thus, by appropriately using C & C button 50, a user can employ microphone 44 either for producing verbal chat messages directed to specific individuals or for producing verbal commands to control a game. However, the C & C button preferably does NOT act as a simple multi-pole switch used to direct the microphone signal between different input ports. Instead, the signal from the microphone is directed by software that is controlled by the state of the C & C button.

By providing the user the option of selecting C & C button 50 to direct verbal messages to the control of a game, microphone 44 performs a dual function that has an equivalent benefit for each function. When the microphone is used either for communicating verbal messages in a chat session or for providing input of secondary commands to control a game, the user does not have to remove his/her hands from a game control device, such as a joystick (not shown), to type a message on the keyboard, as is normally required in a conventional multiplayer game to implement input of text-based chat message, or to enter a command on the keyboard.

It is further contemplated that as an alternative to employing control unit 36, the present invention could be included within other devices coupled to gaming consoles, set top boxes, and other computing devices. For example, part of the functionality of the present invention that is carried out by the control unit might instead be implemented with circuitry included in devices such as mice, keyboards, joysticks, gamepads, or modules that plug into gamepads or connect to computing devices.

As noted above, a conventional PC contains a sound card that is connected to a data bus within processor chassis 12. The data bus conveys only a single stream of audio data, which may include a plurality of different audio inputs that are mixed together. As used herein and in the claims that follow, the term "audio data stream" should not be confused with an audio channel such as used in connection with a left channel or a right channel in a stereo audio signal. In the present context, the term audio data stream is intended to encompass one or more separate and distinct audio signals, and each audio data stream is distinguishable as a separate and distinct entity, produced by a separate source and directed to a separate recipient sound transducer device for ultimate reproduction, without regard for any other audio data stream being processed by the PC. As shown in FIG. 1, PC system 10 includes an optional Dolby Prologic™ decoder 54 that is coupled to processor chassis 12. To simplify the illustration shown in FIG. 1, the Dolby Prologic™ decoder module is shown external to processor chassis 12 and connected thereto by a cable 52, while in fact, the decoder would likely be an integrated circuit module mounted on a sound card within processor chassis 12. Also, the output signal from the Dolby Prologic™ decoder is simplified, being shown as only two channels to drive a left speaker 58a and a right speaker 58b, which are respectively provided with an analog signal from the decoder through cables 56a and 56b. It will be understood that an additional pair of rear channel speakers might be provided, as well as a subwoofer, as is well known to those of ordinary skill in the audio art.

It must again be emphasized that the sound produced through speakers 58a and 58b is from a separate and distinct audio data stream from the sound produced through headphone(s) 42, which is output as a digital signal from the USB port on the PC system through cable 38. While wearing headset 40, a user will hear verbal chat messages through headphone(s) 42 that are localized and readily distinguishable from the separate audio data stream for the game that is produced by a sound card or USB speakers (and optionally processed through Dolby Prologic™ decoder 54 —if included in PC system 10). If Dolby Prologic™ decoder 54 is omitted, the sound card typically will produce only stereo game sounds, appropriate to drive only the two speakers 58a and 58b illustrated in FIG. 1. The sound produced by speakers 58a and 58b during a multiplayer game is from the game executing on PC system 10 and may include sound effects, music, and verbal communication produced by the game. Other sounds conventionally produced by the sound card may also be heard through the speakers, such as wave files from other programs executing on the PC system. The present invention enables a user to participate in a verbal chat session and to hear the chat messages from other participants in a multiplayer game separate and distinct from the sounds produced by execution of the game software on PC system 10. Consequently, the user can experience the relatively high quality sound associated with such games while enjoying the benefit of a verbal chat session in which the verbal messages from other players are readily heard and localized in the headphones separate and apart from the game sounds produced by the two (or more) speakers connected to the sound card (or to a USB port of the PC system—if a sound card is not included in the PC system).

Figure 2:
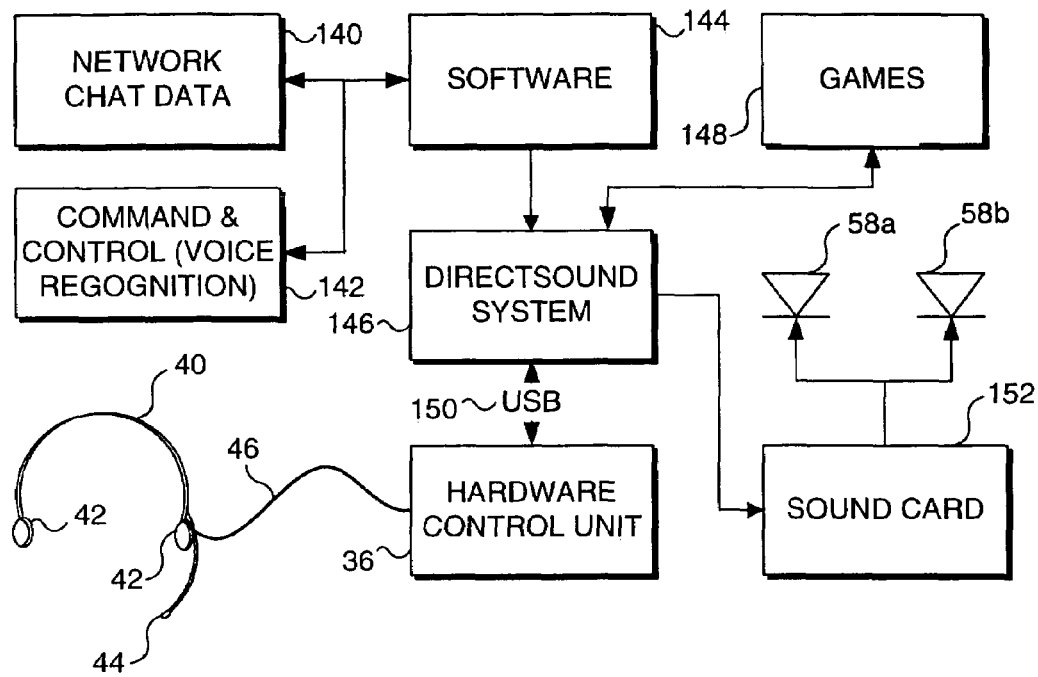
FIG. 2 is a functional block diagram showing the interaction of software and hardware components in the PC system of FIG. 1, when implementing the present invention.

Referring now to FIG. 2, an overview functional block diagram illustrates the relationship between certain hardware and software components in implementing the present invention. The ability to facilitate bidirectional interaction in a network chat session in which the user's voice is transmitted over a network to other players in a multiplayer game is referenced in a block 140. A block 142 indicates that the present invention can selectively also provide C & C input using a voice recognition module for verbally commanding and controlling software such as a game 148. Blocks 140 and 142 are coupled to a block 144 in which software running on PC system 10 is executed to enable participation in a verbal chat session and to enable voice recognition for purposes of C & C. Software 144 processes the verbal message directed to a user during a chat session. In addition, the software directs signals from the microphone to selected other individuals, or alternatively, processes the verbal C & C input from the microphone when implementing voice recognition and produces an output that is applied to Microsoft Corporation's DirectSound™ system 146, as illustrated in the Figure. The DirectSound system is a software module executed by PC system 10. The DirectSound system enables independent processing of the two audio data streams, including the one for the chat session and the sound produced by executing games 148, and facilitates the C & C input. Game sounds are output through a sound card 152 in the first preferred embodiment, and the sound card produces an analog signal directed to left and right speakers 58*a* and 58*b*, so that they reproduce the game sounds separate and apart from the chat message supplied to the user via headphones 42, through a USB port 150. Hardware control unit 36 is coupled to USB port 150 and converts digital chat messages received from the network into corresponding analog chat messages conveyed to headphones 42. While it may not be necessary, it is also contemplated that when a chat communication is being received by the user, the game sound volume can automatically be reduced by a predefined amount, e.g., by 3 to 6 dB, thereby ensuring that the user will be able to hear and understand the voice message received during the chat session.

Microphone 44 produces audio data that are conveyed through lead 46 to hardware control unit 36 and converted into digital audio data in a stream directed either to the C & C option or to the network chat option. The user thus controls not only the recipient of a verbal communication, but also determines whether the microphone signal will be applied to a chat session or to C & C of a game, using control unit 36.

Figure 3:
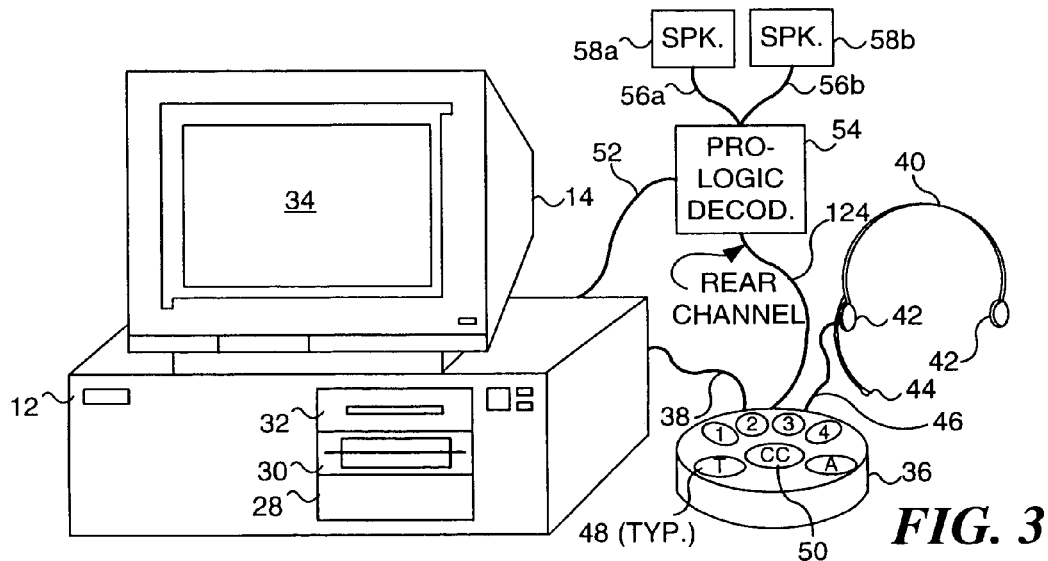
FIG. 3 is a schematic diagram illustrating a second preferred embodiment that uses a Dolby Prologic™ encoder and corresponding decoder to obtain a plurality of separate audio data channels in accord with the present invention.

An alternative embodiment of the present invention is illustrated in FIG. 3. In this embodiment, Dolby Prologic™ decoder 54 (or an equivalent decoder) is used for decoding a separate audio data stream that conveys the chat voice messages from other players at remote sites over the rear channel, while the game sounds are conveyed over the front left and right channels (and optionally, the sub woofer channel). In this embodiment, the DirectSound system receives the network chat data as a separate audio data stream and encodes it into the analog signal supplied through cable 52 to Dolby Prologic™ decoder 54. Also encoded as a separate audio data stream are the game sounds, which will be reproduced on the front left and right speakers (and the subwoofer, if included). The encoded analog signal conveying these two separate and distinct audio data streams is thus provided to the decoder so that the two separate and distinct audio data streams can be decoded and again separated from each other.

As shown in FIG. 3, a conductor 124 conveys the chat audio data derived from the rear channel that has been decoded through conductor 124 to control unit 36. It should be noted that the Dolby Prologic™ decoder (or other decoder capable of recovering the separate and distinct audio data streams) can be included within control unit 36, and is simply shown as a separate component in FIG. 3 for purposes of more clearly illustrating this embodiment of the present invention. The analog signal conveying the chat audio data, recovered as the rear channel, is supplied to headset 40 so that the user hears the verbal chat messages through headphone(s) 42. In addition, the game sounds are conveyed through leads 56*a* and 56*b* to left and right speakers 58*a* and 58*b* respectively (the subwoofer is again not illustrated in this Figure).

Integrated circuits are readily available for decoding Dolby Prologic™ encoded signals to recover the separate audio streams for the game sounds and for chat verbal messages. As an alternative, it is also possible to decode the encoded signal using phase difference circuits that determine the difference between the left and right channels of the encoded signal. The difference signal is then passed through a low-pass filter, e.g., a filter designed to pass signals below seven kHz and block frequencies above. Optionally, a noise reduction circuit can be applied to the filtered signal to provide a cleaner verbal chat signal to headphone(s) 42. Such alternative decoder circuits are less desirable, because they do not provide the front to rear channel separation that can be achieved from a true Dolby Prologic™ decoder circuit; however, the alternative decoder circuits are relatively inexpensive, since they are much simpler circuits.

Figure 4:
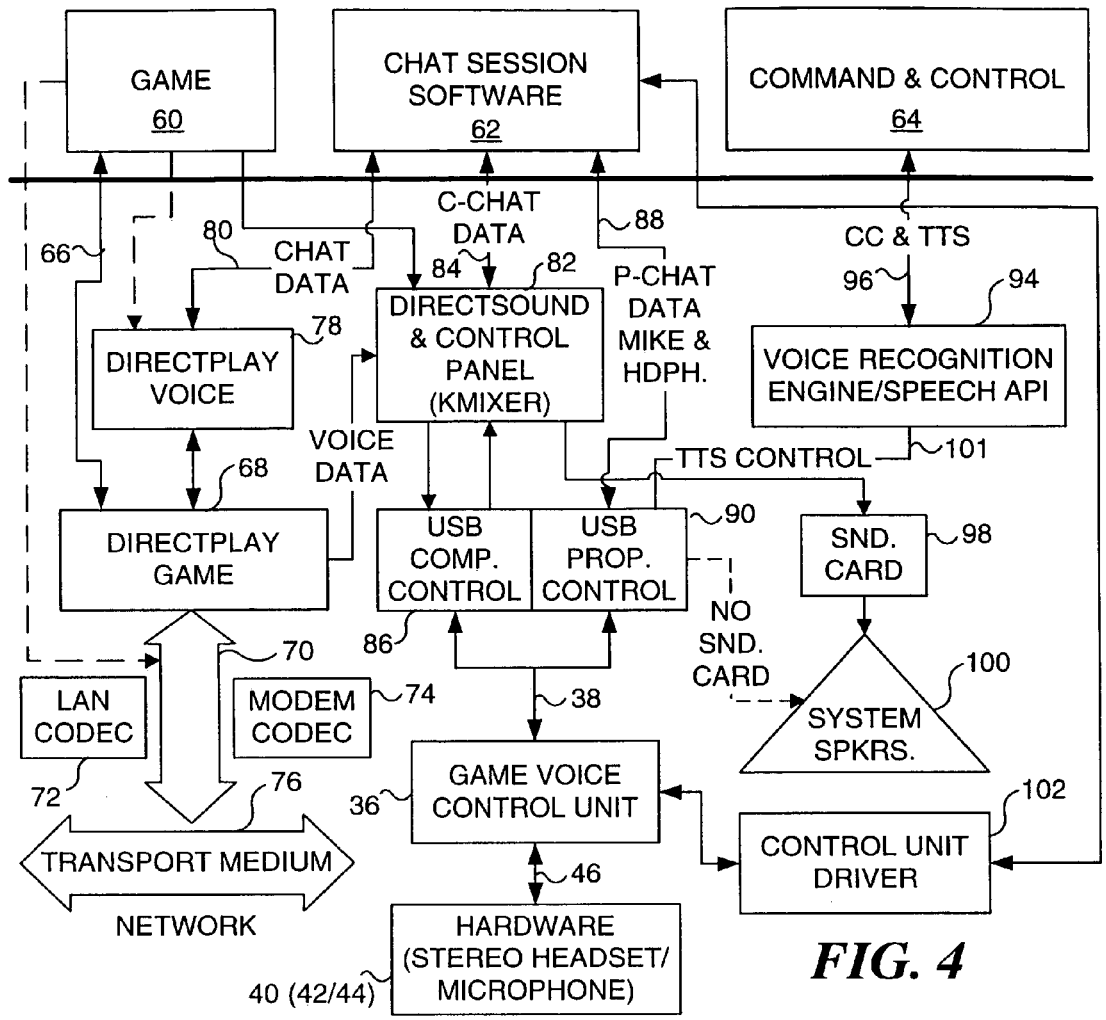
FIG. 4 is a schematic block diagram illustrating details of the functional components used to implement the present invention.

Further details of the functional components that implement the present invention are shown in FIG. 4. The primary software components are shown above the dark horizontal line and include a multiplayer game 60, a chat session software module 62, and a C & C module 64 that facilitates verbal commands being applied to control various options that are user selectable for controlling the game. A link 66 provides communication between the game that is being executed by the PC system and a DirectPlay game module 68 that is part of the operating system, e.g. Microsoft's Corporation's Windows 98™. DirectPlay game module 68 communicates with other players in a multiplayer game with data 70 that are conveyed over a transport medium 76. The connection to the transport medium is implemented, for example, through a local area network coder/decoder (codec) 72 or a modem codec 74. LAN codec 72 is used to communicate data 70 over a LAN to which the other players are also connected, while if modem codec 74 is used, data 70 are communicated over the Internet or over another type of wide area network. Accordingly, transport medium 76 includes wire or wireless data communication channels such as telephone lines, satellite interlinks, radio communications, cable modem, various forms of digital subscriber lines, etc., all of which are well known to those of ordinary skill. Data 70 are conveyed bi-directionally. Also, in a multiplayer mode, game 60 executes on each of the player's computers and is updated to reflect control input and the play of the game by each of the players who are participating.

Part of the content of data 70 are chat messages that are included in the data packets transmitted over transport media 76 between selected players within the game. Verbal messages received from other players by DirectPlay game module 68 are conveyed to a DirectSound and control panel that includes a "Kernel Mixer (Kmixer) component" that serves the function of mixing sounds from different sources. In the second preferred embodiment, the Kmixer component encodes the different audio data streams in a Dolby Pro-logic™ encoded signal. Chat data provided from chat session software 62, representing verbal messages from the user to other selected recipients is conveyed from chat session software 62 over a chat data line 80 to a DirectPlay voice module 78, which conveys the chat data to DirectPlay game module 68 for transmission to the selected recipients as part of data 70.

It should be noted that DirectSound and control panel 82 is able to operate in a compatible mode, i.e., in a mode that is compatible with a conventional PC system that does not include the capability of processing two separate audio data streams so that the audio data they convey are separately provided to the user. Thus, in compatible mode, the DirectSound and control panel mixes the chat voice data received from direct game play module 68 with the game sounds so that the user hears both audio data streams, including the audio for the game and the verbal chat messages through system speakers 100. Assuming that the PC system includes a sound card 98, DirectSound and control panel 82 uses the Kmixer to mix the two audio data streams together and presents them to sound card 98, just as would be done in a conventional PC system that cannot implement the present invention. Sound card 98 produces an analog output that is directed to system speakers 100. However, if the PC system is equipped to process a plurality of separate audio data streams in accord with the present invention, proprietary chat data for the microphone and headphone(s) 42 are transferred between the chat session software and a USB proprietary control 90. When operating in the compatible mode that does not provide for separate audio data stream processing, data are transmitted bi-directionally between DirectSound and control panel 82 and a USB compatible control 86. The signals conveyed through either USB compatible control 86 or USB proprietary control 90 are digital, and as noted above, are conveyed over a lead 38, which is connected to control unit 36.

Chat session software 62 communicates with a control unit driver 102 to facilitate operation of control unit 36. As previously noted above, headset 40 with headphones 42 and microphone 44 is connected to the control unit through lead 46. It should be emphasized that only when using USB proprietary control 90, will control unit 36 provide a separate audio data stream to headphone(s) 42 (i.e., separate from the audio data stream provided to system speakers 100) comprising the verbal messages received during a chat session, for example, while a user is engaged in a multiplayer game. The other audio data stream, such as the game sounds, is then produced by system speakers 100. It is also noted that if sound card 98 is not provided, the USB proprietary control can produce a digital sound output through a USB port to drive system speakers 100 that are compatible with connection to PC system 10 through a USB port.

Another aspect of the present invention that depends upon the operation of USB proprietary control 90 is the option of selectively controlling game 60 using verbal commands spoken by the user into microphone 44, since this feature will not work if USB compatible control 86 is being used. The voice command from microphone 44 is transferred as an analog signal through line 46 to control unit 36, which converts it to a digital signal that is supplied to USB proprietary control 90. A text-to-speech (TTS) control line 101 connects USB proprietary control 90 to a voice recognition engine/speech application program interface (API) 94. In this preferred embodiment, the voice recognition engine/speech API is provided by Learnout and Hauspie and is a voice recognition engine also used for voice recognition during word processing. The voice recognition engine/speech API converts the digital voice command into a corresponding command signal for controlling game 60, which is transferred through a line 96 to C & C block 64. It should also be noted that a different engine is employed to provide input to the voice recognition engine/speech API of text for implementing a text to speech (TTS) function that reads back text verbally to the user through headphone(s) 42.

Command and control module 64 enables a user to specify verbal commands and to associate the verbal command with corresponding secondary commands for a specific game running on the PC system. Thus, a user can selectively identify secondary control functions of the type normally input through a keyboard for controlling game 60 and associate these control functions with specific verbal commands. By being able to actuate a control function simply by speaking the verbal command associated with the control function through microphone 44, the present invention enables the user to avoid setting aside a game controller such as a joystick in order to enter the control functions by typing on a keyboard. The ability to enter verbal commands for control of a game thus greatly facilitates efficient game play. As noted previously, the user selectively determines whether a verbal message spoken into microphone 44 is directed to selected recipients in a chat session or is directed to voice recognition engine/speech API 94, by actuating switch 50 on control unit 36 that causes the software to direct the signal from the microphone to the chat session or to the voice recognition system.

Figure 5:
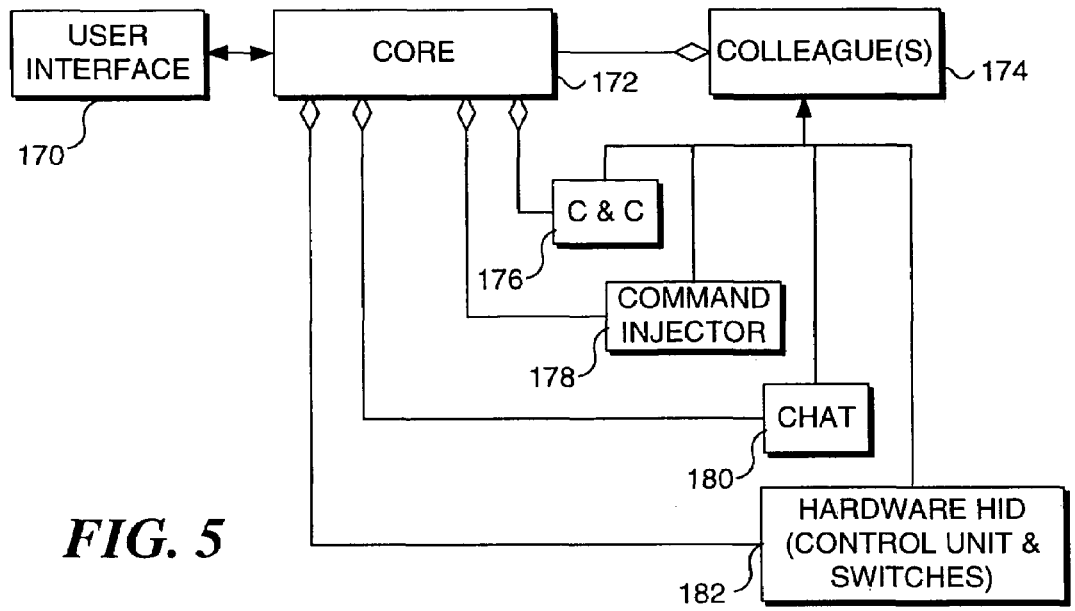
FIG. 5 is a schematic block diagram illustrating the relationship between the functional modules of the present invention.

With regard to FIG. 5, additional details illustrating how components of the present invention interact during execution of a multiplayer game are illustrated in schematic form. A user interface 170 includes the components that enable a user of PC system 10 to interact with a core 172 in which the game and various other software components are executed. The user interface includes a display of graphics and text and enables various types of input from the user through hardware components, including the control unit and headset of the present invention. Core 172 enables the user to communicate in a chat session with one or more colleagues 174 over a network, and the data communicated can include both verbal chat data and data for implementing multiplayer game play.

Core 172 includes four functional components that implement the present invention. A C & C module 176 is used for input of verbal commands that facilitate control of the game by the user. A command injector 178 facilitates application of the verbal commands to controlling the software executed by core 172. A chat block 180 enables the user to bi-directionally chat with colleague 174, and a hardware human interface device (HID) with push-button switches 182, comprising control unit 36 and the switches contained thereon, enables the user to selectively choose the individual to whom the user's chat communication will be directed (switches 48), and to selectively determine if a verbal communication from the user will be directed to the chat session or to the C & C function (software function controlled by C & C switch 50).

In a broader sense, the selective input from microphone 44 to either a chat session or to implement C & C of a game can be more broadly expanded so that the microphone input is selectively directed to more than two different applications, and to applications other than a chat session and game control. It is contemplated that the present invention might be used to direct the signal from a microphone to another person over a network, or alternatively, to a voice recognition word processing application running on the user's computer. In addition, the present invention is broadly applicable to other types of devices. For example, a user might employ a switch in accord with the present invention to control whether the audio signal produced by a microphone connected to a cell phone or a desk phone is transmitted to another person over the telephone system or instead, is used to control the operation of the cell phone or desk phone.

Figure 6:
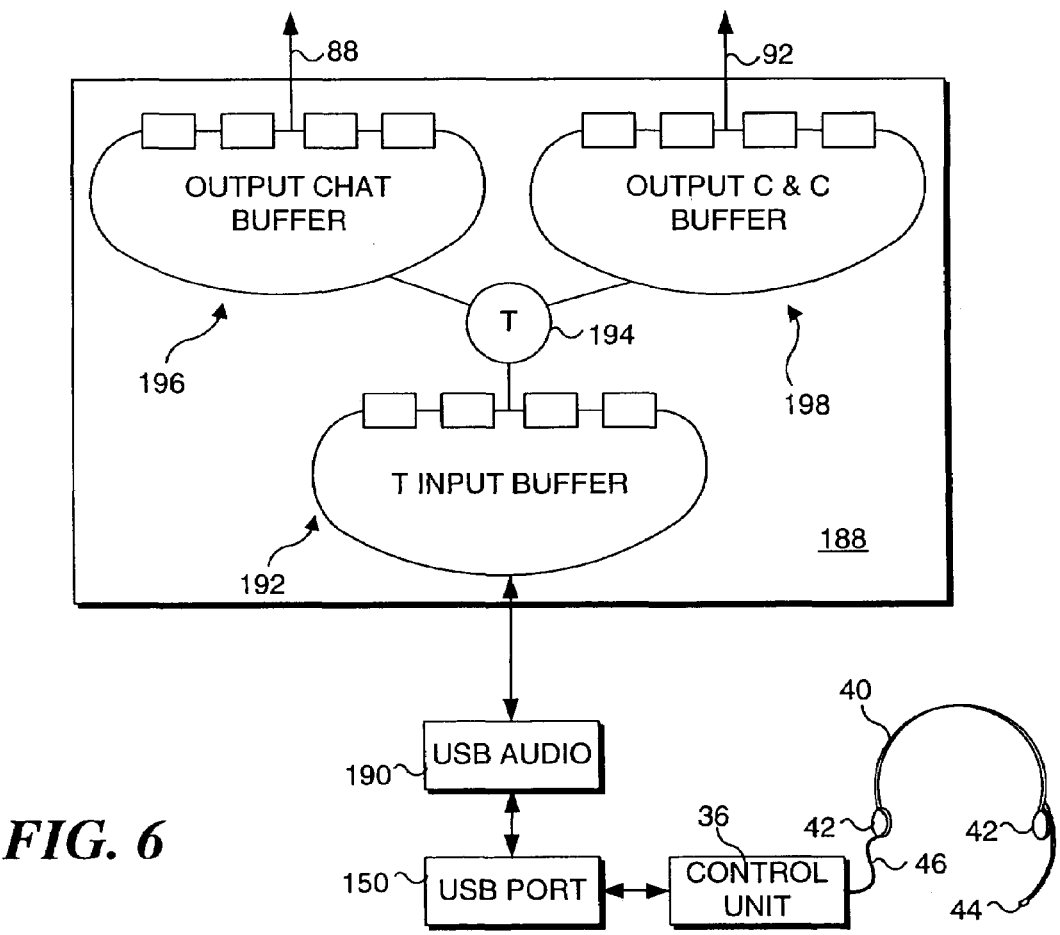
FIG. 6 is a schematic block diagram illustrating the plurality of buffers used to facilitate multiple audio data inputs from a single microphone in the present invention, so that it appears to perform as a plurality of microphones.

In a PC or other type of computing device, a conventional sound card does not provide any means for selectively directing microphone input to different applications in the manner of the present invention. As shown in FIG. 6, the audio signal produced by a user speaking into microphone 44 is converted into a corresponding digital signal by control unit 36 and conveyed as an input signal to USB port 150. The digital signal applied to USB port 150 comprises USB audio 190 that is input to a "T" module 188 that includes a plurality of buffers including an input "T" buffer 192 for a "T" selector 194. T selector 194 is controlled by C & C switch 50 on control unit 36 in the preferred embodiment discussed above, since the user actuates the C & C switch to selectively determine whether the signal from microphone 44 is directed by T selector 194 to a chat session or into a C & C application. The T switch is a software control that determines whether the data stored in the input T buffer is copied to either a chat buffer 196 or a C & C buffer 198. It will be understood that more than two such buffers can be provided to selectively receive the data copied from the input T buffer. Thus, the T selector enables the T module to act like a sound card that has two (or more) microphones connected thereto for input of separate audio data, when in fact, only a single microphone provides the input signal, in this embodiment.

A series of logical steps are implemented by T module 188. Upon start up or reset of the PC system, the logic tells the PC system that "virtual multiple microphones" exist and are available to produce audio data in formats that the PC system supports. When control unit 36 is first connected to USB port 150, the logic sets the recording format to that of the first application to actively employ the microphone for input of audio data. For example, in regard to the example discussed above, assuming that the user has not actuated C & C switch 50 on control unit 36, the microphone will be used for producing a verbal input to the chat software and thus the recording format would be set for that of chat data. Input T buffer 192 and output chat buffer 196 would then be created in the memory of the PC system to capture and output data from USB audio 190. The input T buffer would receive the digital data corresponding to the verbal message spoken by the user for transmission to another one or more individuals as part of the chat session. Next, the logic provides for copying the data from input T buffer 192 into output chat buffer 196.

When the user selects C & C switch 50 on control unit 36, connection of a second virtual microphone is initiated in the software, and the C & C buffer is created to receive audio data. However, at this point, the logic first copies a value corresponding to silence into the output chat buffer so that the signal output on line 88 corresponds to a microphone with no sound input. The digital audio signal derived from the command spoken into the microphone that is intended by the user to C & C a game is loaded into input T buffer 192 and copied from it into C & C buffer 198 through T selector 194. On each subsequent connection of a virtual microphone, the output buffer for that application is created in memory to receive audio data and silence is copied to the preceding output buffer. Focus is always set to the new output buffer to receive the incoming digital audio data. It will therefore be understood that while only two output buffers are shown in FIG. 6, additional output buffers can be employed by extension, using a T selector that includes a different position for each output buffer.

Figure 7:
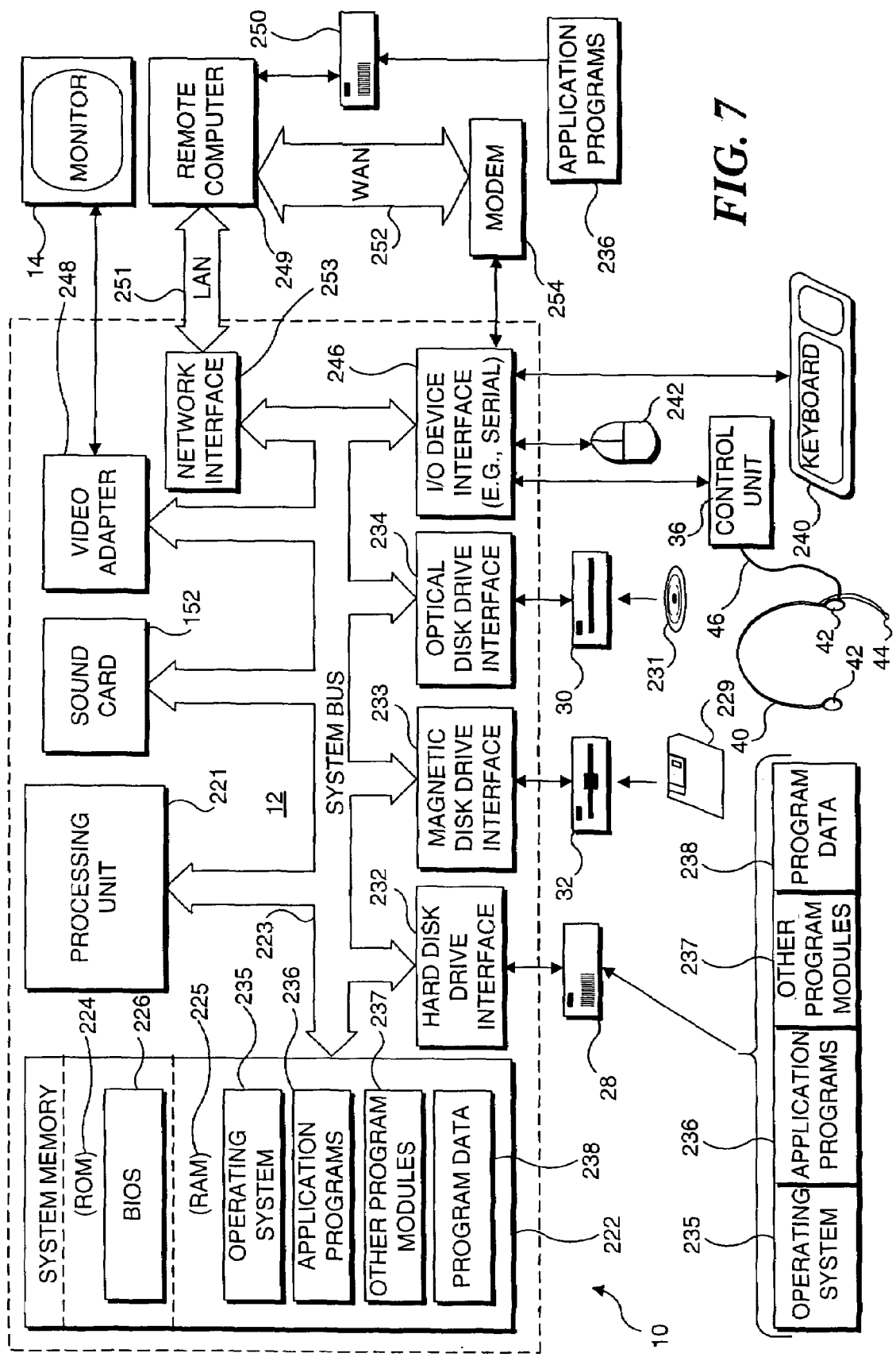
FIG. 7 is a schematic block diagram of a PC system suitable for implementing the present invention.

FIG. 7 and the following discussion are intended to provide a brief, general description of a suitable computing environment for implementing the present invention. Although not required, certain aspects of the present invention are described in the general context of computer executable instructions, such as program modules, that are executed by a PC. Generally, program modules include routines, programs, objects, components, data structures, etc. that perform particular tasks. Moreover, those skilled in the art will appreciate that this invention may well be practiced with other processor configurations and on a variety of very different types of electronic devices, including hand-held devices such as personal data assistants (PDA's), pocket PC's, and cell phones, multiprocessor systems, microprocessor based or programmable consumer electronic devices, network personal computers, minicomputers, mainframe computers, home servers, small business server appliances, focused enterprise devices, game consoles, Internet appliances, and TV attached products (such as set top boxes, gaming devices, video management devices, and WebTV™).

With reference to FIG. 7, an exemplary system for implementing the present invention includes a general purpose computing device in the form of conventional PC system 10, provided with a processing unit 221, a system memory 222, and a system bus 223. The system bus couples various system components including the system memory to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help to transfer information between elements within PC system 10, such as during start-up, is stored in ROM 224. PC system 10 further may include hard disk drive 28 for reading from and writing to a hard disk, not shown, and may include magnetic disk drive 32 for reading from or writing to a removable magnetic disk 229, and optical disk drive 30 for reading from or writing to a removable optical disk 231, such as a compact disk-ROM (CD-ROM), DVD, or other optical media. Hard disk drive 28, magnetic disk drive 32, and optical disk drive 30 are connected to system bus 223 by a hard disk drive interface 232, a magnetic disk drive interface 233, and an optical drive interface 234, respectively. The drives and their associated computer readable media provide nonvolatile storage of computer readable machine instructions, data structures, program modules and other data for PC system 10. Although the exemplary environment described herein employs a hard disk, removable magnetic disk 229, and removable optical disk 231, it will be appreciated by those skilled in the art that other types of computer readable media, which can store data that are accessible by a computer, such as magnetic cassettes, flash memory cards, digital video disks, Bernoulli cartridges, RAM cards, ROM, and the like, may also be used in the exemplary operating environment.

A number of program modules may be stored on the hard disk, magnetic disk 229, optical disk 231, ROM 224 or RAM 225, including an operating system 235, one or more application programs 236 (such as a multiplayer game), other program modules 237, and program data 238. A user may enter commands and information into PC system 10 through input devices such as a keyboard 240, the microphone discussed above (but not shown in this Figure), and a pointing device 242. Other input devices (not shown) include a joystick, game pad, satellite dish, scanner, or the like. These and other input devices are often connected to processing unit 221 through an input/output (I/O) interface 246 that is coupled to the system bus. The term I/O interface is intended to encompass each interface specifically used for a serial port, a parallel port, a game port, a keyboard port, and/or (USB) port, as appropriate for the external devices that are thus coupled to the PC system. A monitor 14 or other type of display device is also connected to system bus 223 via an appropriate interface, such as a video adapter 248. In addition to the monitor, PCs are often coupled to other peripheral output devices (not shown), such as printers. The speakers connected to sound card 152 are not shown in this Figure.

PC system 10 may operate in a networked environment using logical connections to one or more remote computers, such as a remote computer 249. Remote computer 249 may be another PC, a server, a router, a network PC, a peer device, or other common network node, and typically includes many or all of the elements described above in connection with PC system 10, although only an external memory storage device 250 has been illustrated in FIG. 7. The logical connections depicted in FIG. 7 include a local area network (LAN) 251 and a wide area network (WAN) 252. Such networking environments are common in offices, enterprise-wide computer networks, intranets and the Internet.

When used in a LAN networking environment, PC system 10 is connected to LAN 251 through a network interface or adapter 253. If used in a WAN networking environment, PC system 10 typically includes a modem 254, or other means for establishing communications over WAN 252, such as the Internet. Modem 254, which may be internal or external, is connected to the system bus 223, or coupled to the bus via I/O device interface 246, i.e., through a serial port. In a networked environment, program modules depicted relative to PC system 10, or portions thereof, may be stored in the remote memory storage device. It will be appreciated that the network connections shown are exemplary and other means of establishing a communications link between the computers may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method for selectively enabling a user to direct an audio signal into different audio data streams on a computing device, so that the audio signal appears to be from a different source relative to each audio data stream and is selectively used for different functions, said computing device being coupled to a network for output of an audio data stream comprising chat data transmitted to one or more different user-selectable entities, comprising the steps of:
(a) providing a microphone for entry of analog audio data for processing by the computing device to produce said different audio data stream and the audio signal is selectively used for different functions;
(b) converting the analog audio data into digital audio data comprising said different audio data streams;
(d) providing a switching device adapted to enable the user to selectively control the processing of the digital audio data by actuating one or more switches on the switching device that determine to whom the audio data stream is to be sent;
(e) determining that a first switch has been activated, the first switch being configured to direct the audio data stream to a determined group of users;
(f) in response to determining that the first switch has been activated, transmitting the digital audio data as chat data over the network to a the determined group of users; and
(g) determining that a second different switch has been activated, the second switch being configured to direct the audio data stream to a selected subset of the group of users;
(h) in response to determining that the second different switch has been activated, transmitting the digital audio data as chat data over the network to the selected subset of the group of users.

2. The method of claim 1, further comprising the step of providing an additional switch for enabling the user to direct the digital audio data to a voice recognition module configured to recognize control commands for controlling the computing device.

3. The method of claim 2, further comprising the step of employing the voice recognition module to recognize control commands for controlling a software application executing on the computing device.

4. The method of claim 1, further comprising the step of temporarily storing the digital audio data in an input buffer, wherein the switching device directs the digital audio data into a selected output buffer, a different output buffer being provided for each different audio data stream.

5. The method of claim 1, further comprising the step of coupling the digital audio data to the computing device through a universal serial bus port.

6. A machine readable medium having processor executable instructions for performing the step recited in claim 4.

7. A system for processing a first audio data stream and at least a second audio data stream to produce separate audio outputs concurrently audible to a user and corresponding to each audio data stream, the second audio data stream being capable of transmission to one or more different user-selectable groups, the system comprising:
(a) a computing device that includes a processor and a memory, said memory storing a plurality of machine instructions that are executed by the processor to receive data from another computing device for use in connection with a software application being executed by the processor, execution of said software application causing said at least the second audio data stream to be produced, and said data conveying said first audio data stream that is maintained separate from all other audio data streams that are processed by the computing device;
(b) converter means connected to separately receive the audio data streams input to the computing device, for separately converting each of the audio data streams into corresponding analog audio signals, said converter means including an external switching device comprising a plurality of switches, the converter being coupled in communication with the computing device, which converts the first audio data stream into a corresponding analog audio signal, and which enables a user to select a recipient group of users using a first switch among the plurality of switches on the external switching device, the first switch being configured to direct the audio data stream to the selected recipient group of users, and enables a user to select a subset of the group of users using a second, different switch among the plurality of switches on the external switching device, the second switch being configured to direct the audio data stream to the selected subset of the group of users, the user selection being processed by the computing device to produce an output audio data stream that is selectively transmitted by the computing device to at least one of the recipient group or the selected subset of the group of users selected by the user, along with output audio data produced by the software application such that said output audio data stream and said output audio data are concurrently audible to a user; and (c) a plurality of sound transducers connected to separately receive the analog audio signals, said plurality of sound transducers producing different and unrelated sounds corresponding to the analog audio signals that are audible to a user.

8. The system of claim 7, further comprising a network interface that couples the computing device in communication with a network, wherein the first audio data stream is received over the network from a remote site and comprises a verbal chat message related to the software application.

9. The system of claim 7, wherein a portion of the machine instructions stored in the memory and executed by the processor comprises the software application, and wherein the converter means includes a sound card that receives said at least the second audio data stream from the software application executed by the processor, so that the plurality of sound transducers produce sounds associated with the software application.

10. The system of claim 9, wherein the computing device includes a data port; and wherein the switching device is coupled to the data port receives the first audio data stream and converts it to the corresponding analog audio signal, said switching device being adapted to connect to one of the plurality of sound transducers that thus receives said corresponding analog audio signal, producing sounds corresponding thereto.

11. The system of claim 10, wherein said one of the plurality of sound transducers comprises a headset that includes a microphone, said switching device including a switch that enables a user to selectively route a signal produced by the microphone to a desired audio data channel that is coupled to a selected recipient who is interacting with the software application.

12. The system of claim 11, wherein the machine instructions stored in the memory, when executed by the processor implement a speech recognition function; one of the audio data streams to which the switch selectively directs the signal produced by the microphone comprising an input to the speech recognition function, enabling a user to selectively input verbal commands through the microphone to the speech recognition function for controlling the software application being executed by the processor of the computing device.

13. The system of claim 12, further comprising an additional switching device that enables a user to direct the digital audio data to the speech recognition module, wherein the speech recognition function enables a user to assign a verbal command to a corresponding control function used in the software application.

14. The system of claim 11, wherein the machine instructions stored in the memory implement an input buffer and a plurality of output buffers in the memory, the signal from the microphone being temporarily stored in the input buffer, said switch determining one of the plurality of output buffers to which the signal will be transferred from the input buffer for output to the desired audio data stream.

15. The system of claim 7, wherein the converter means comprise a multi-channel encoder that encodes the first audio data stream into a specific channel of an encoded analog signal and encodes said at least the second audio data stream in other channels of the encoded analog signal, further comprising a decoder that recovers a first analog signal corresponding to the first audio data stream from the encoded signal and supplies the first analog signal to one of the plurality of sound transducers and recovers other analog signals corresponding to at least the second audio data stream from the encoded signal and supplies the other analog signals to others of the plurality of sound transducers.

16. The method of claim 1, wherein the first determined group of users comprises computer game players connected to a common computer game.

17. The method of claim 1, wherein the first determined group of users comprises chat session participants connected to a common chat session.

18. The method of claim 16, wherein the selected subset of the determined group of users comprises computer game players connected to the common computer game that are on the user's team in the computer game.

19. The method of claim 17, wherein the selected subset of the determined group of users comprises those chat session participants selected by the user to be part of the subset.

* * * * *